Dec. 11, 1923.                                                                  1,476,836
                              H. W. PLEISTER
                          NAIL EXPANSION METHOD
                            Filed Dec. 2, 1921                 2 Sheets-Sheet 1
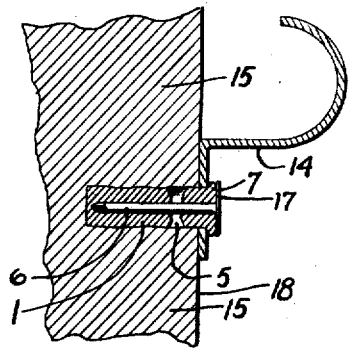
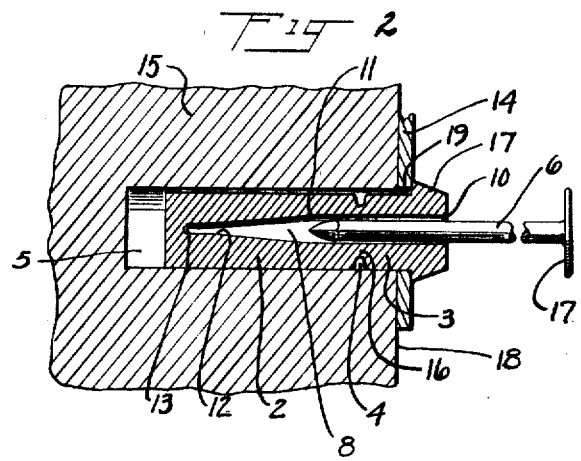
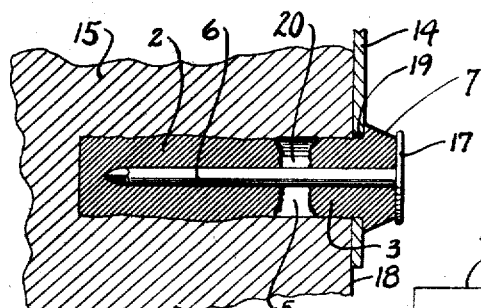
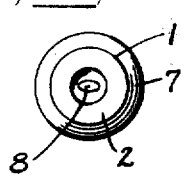
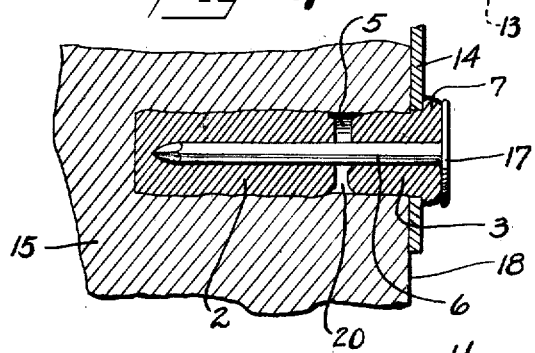
Henry W. Pleister INVENTOR
BY Alan M Johnson ATTORNEY Dec. 11, 1923.
H. W. PLEISTER
1,476,836
NAIL EXPANSION METHOD
Filed Dec. 2, 1921
2 Sheets-Sheet 2
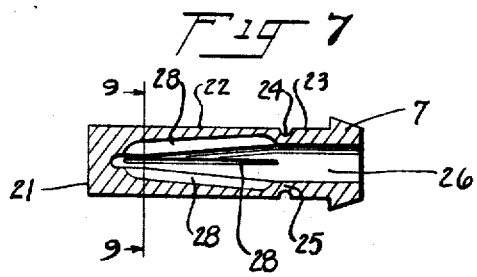
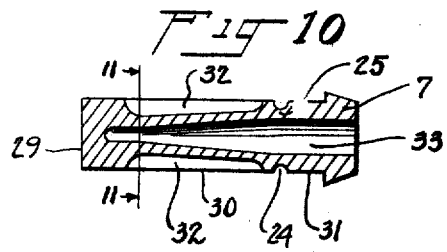
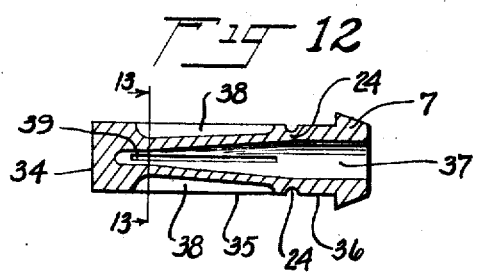
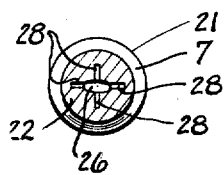 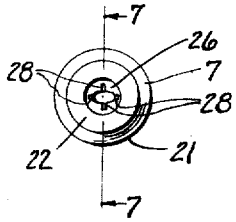 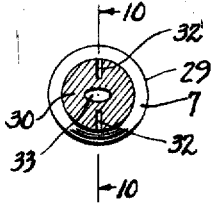 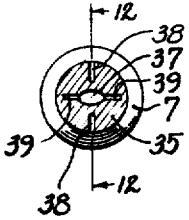
Henry W. Pleister INVENTOR
BY Alan M Johnson ATTORNEY Patented Dec. 11, 1923.

1,476,836

UNITED STATES PATENT OFFICE.

HENRY W. PLEISTER, OF WESTFIELD, NEW JERSEY, ASSIGNOR TO HENRY B. NEWHALL.

NAIL-EXPANSION METHOD.

Application filed December 2, 1921. Serial No. 519,466.

*To all whom it may concern:*

Be it known that I, HENRY W. PLEISTER, a citizen of the United States, residing at Westfield, in the county of Union and State of New Jersey, have made certain new and useful Improvements in Nail-Expansion Methods, of which the following is a specification taken in connection with the accompanying drawings.

My invention relates to the method of using nail expansions in which by merely driving the nail into the expansion the work is secured to the wall or other suitable support.

My invention more particularly relates to the method of using a nail expansion in which by simply driving in the nail the expansion or body member is broken and separated into at least two parts, one of the parts being carried along with the nail until it reaches the end of the hole, where it gives a powerful expansion removed from the face or surface of the wall or other suitable support.

My invention further relates to the method of using such a severable nail expansion in which, after the main securing expansion has been accomplished at the bottom of the hole, a separate and distinct expansion of the other portion of the body member is accomplished by further driving in the nail so as to plug or close the opening into the hole, preventing moisture working into the hole.

My invention further comprises the method of securing an object to a wall or other suitable support, and then sealing the opening.

In the drawings I have shown different embodiments of my invention, but it is of course to be understood that my invention is not to be confined to the embodiments shown by way of illustration.

Fig. 1 is a vertical section of one form of my invention;

Fig. 2 is a vertical section, similar to Fig. 1, but on an enlarged scale showing the parts in their first securing position;

Fig. 3 is a vertical section showing the parts after the nail has broken the body member;

Fig. 4 is a vertical section, similar to the other figures, showing the final position of the parts;

Fig. 5 is a plan view of the nail expansion shown in Figs. 1 to 4;

Fig. 6 is an end elevation of the nail expansion shown in Figs. 1 to 5;

Fig. 7 is a vertical section of a modified form of nail expansion on the line 7—7 of Fig. 8;

Fig. 8 is an end elevation of the nail expansion shown in Fig. 7;

Fig. 9 is a vertical section on the line 9—9 of Fig. 7;

Fig. 10 is a vertical section of still another modification;

Fig. 11 is a vertical section on the line 11—11 of Fig. 10;

Fig. 12 is a vertical section of still another modified form of my nail expansion, taken on the line 12—12 of Fig. 13;

Fig. 13 is a vertical section on the line 13—13 of Fig. 12.

In my invention I provide a nail expansion 1 formed of any suitable material. Preferably I form it of lead or an alloy, or any other ductile material. This nail expansion has a body member formed of the two severable members 2 and 3. Any suitable means, as a weakening slot 4, is employed to hold the members together for shipment and handling, but to permit the two members 2 and 3 to be separated from each other in the hole 5 by simply driving in the nail 6. The member 3 is provided with a ductile plug or compressible flange 7 which is preferably of a little larger diameter than the body members 2 and 3. Through the body members extend an axial bore 8, preferably elliptical in cross section and which preferably does not extend to the end 9 of the expansion. The axial bore from the point 10 to about the point 11 is of uniform diameter sufficiently large to permit the ready passage of the nail 6 without expanding the body members 2 and 3. The axial bore 8 from about the point 11 to the point 12 tapers, and from the point 12 to point 13 is substantially of the same diameter and smaller than the diameter of the expanding nail. It is of course, to be understood that the proportion and contour of the interior of the nail expansion may be varied without departing from my invention.

To secure the work 14 of any suitable form to the wall or other suitable support 15 a hole 5 is drilled within the wall somewhat deeper than the length of the nail expansion. The parts are first brought into the position shown in Fig. 2. When the end of the nail 6 reaches the restricted inclined axial bore between the points 11 and 12, the friction of the nail in the axial bore will be greater than the strength of the fin 16 holding the two body members 2 and 3 together. By further blows upon the head 17 of the nail 6 the fin 16 will be ruptured and cause the broken body member 2 to move down to the bottom of the hole 5 where it will become seated, the end of the hole acting as a positive stop to the further movement of the body member 2, as shown for example in Fig. 3. In this figure the space between the two separated body members 2 and 3 is numbered 20. In this figure the head 17 is shown flush with the ductile plug or compressible flange 7. In the position of the parts shown in Fig. 3, the main expansion strains have been thrown upon the body member 2 but only after this member has been moved to the bottom of the hole 5 and away from the surface 18 of the wall or other suitable support 15, so that such expanding strains will not chip or mar the surface around the opening of the hole 5.

By further blows upon the head 17 (Fig. 3) of the nail 6 the expanding member 2 is caused to grip the interior of the hole with a more powerful grip so that a stronger and more powerful expansion is had. The other member 3 is located in the opening 19 in the work and is held by the compressible flange 7 engaging with the exterior surface of the work 14. After the head of the nail 17 engages with the compressible flange 7, further blows upon the head of the nail 17, by a hammer or other tool, will cause the flange 7 to flatten out as shown in Fig. 4.

In the form of nail expansions now used it is impossible to get a secure hold between the work supported and the expansion. The work is usually made of iron. If any portion of the iron expansion now used contacts with the iron work, further driving in of the head of the nail by hammering does not make a tighter connection between the expansion and the work. On the contrary, when the cold iron of the expansion is hammered against the cold iron of the work there is a spring rebound, which will prevent a tight fit. This spring rebound will also cause a vibration of the fastening which has a tendency to loosen the expansion within the hole. By my invention this objection is overcome and a complete sealing of the opening in the wall, as well as the opening in the work is accomplished preventing moisture from working into the hole.

I have shown different modifications of my invention in Figs. 7 to 13 inclusive. In Figs. 7, 8 and 9 I employ a ductile nail expansion 21 having the severable body members 22 and 23 and weakening slot 24 with the breakable fin 25. The axial bore 26 in this form of my invention, is provided with four weakening grooves 28, 28. These grooves do not extend to the outer periphery of the body member but permit the nail 6 to more readily expand the member 22 after it has been separated from the member 23 by rupturing the fin 25 all as explained in the previous form.

In Fig. 10, I have shown still another modification in which the ductile nail expansion 29 is formed of two severable body members 30 and 31 with a weakening slot 24 and a breakable fin 25. In this form, however, I provide the body member 30 with longitudinally extending weakening grooves 32, 32, which extend from the periphery of the expansion toward the axial bore 33 but do not extend into it. These grooves 32, 32 permit the more ready expansion of the body member 30 after it has been broken from the member 31 and has become seated at the bottom of the hole 5.

In Figs. 12 and 13, I have shown a still further modification of my invention in which the ductile nail expansion 34 is provided with two severable body members 35 and 36 and weakening slot 24. In this form, the nail expansion is provided with two sets of weakening grooves 38, 38, Fig. 13, which extend from the periphery toward but not into the axial bore 37, and also with weakening grooves 39, 39 arranged 90° from the other grooves 38, 38. These grooves extend from the axial bore, but do not touch the periphery of the expansion 34.

Having thus described this invention in connection with illustrative embodiments thereof, to the details of which I do not desire to be limited, what is claimed as new and what is desired to secure by Letters Patent is set forth in the appended claims.

What I claim is:—

1. The method of securing an object to a wall or other suitable support consisting in forming a hole of the required diameter in the wall, inserting a breakable nail expansion provided with an axial bore, driving a nail into the axial bore and breaking the nail expansion into at least two parts, forcing one of the broken parts into contact with the bottom of the hole, and then expanding it removed from the outer surface of the wall where the force of expansion would tend to chip or crack the surface around the hole, the other broken part serving to center the nail.

2. The method of securing an object to a wall or other suitable support consisting in forming a hole of the required diameter in the wall, inserting a breakable nail expansion provided with an axial bore, driving a nail into the axial bore and breaking the nail expansion into at least two parts, forcing one of the broken parts into contact with the bottom of the hole, and then expanding it removed from the outer surface of the wall where the force of expansion would tend to chip or crack the surface around the hole and then closing or calking the exposed end of the hole with the other broken part of the nail expansion to prevent moisture working into the hole.

3. The method of securing an object to a wall or other suitable support consisting in forming a hole of the required diameter in the wall, inserting a breakable ductile nail expansion provided with an axial bore, driving a nail into the axial bore and breaking the ductile nail expansion into at least two parts, forcing one of the broken parts into contact with the bottom of the hole, and then expanding it removed from the outer surface of the wall where the force of expansion would tend to chip or crack the surface around the hole, the other broken part of the ductile nail expansion serving to center the nail.

4. The method of securing an object to a wall or other suitable support consisting in forming a hole of the required diameter in the wall, inserting a breakable ductile nail expansion provided with an axial bore, driving a nail into the axial bore and breaking the ductile nail expansion into at least two parts, forcing one of the broken parts into contact with the bottom of the hole, and then expanding it removed from the outer surface of the wall where the force of expansion would tend to chip or crack the surface around the hole and then closing or calking the exposed end of the hole by pressure upon the other portion of the ductile nail expansion to prevent moisture working into the hole.

HENRY W. PLEISTER.

Witnesses:
MARY R. RYAN,
MAYE D. LINK.